United States Patent
Hoepfner et al.

(10) Patent No.: US 10,436,156 B2
(45) Date of Patent: Oct. 8, 2019

(54) AIR FIN FOR A HEAT EXCHANGER, AND METHOD OF MAKING THE SAME

(71) Applicant: Modine Manufacturing Company, Racine, WI (US)

(72) Inventors: Tim Hoepfner, Filderstadt (DE); Niko Neub, Korntal-Muenchingen (DE); Rifaquat Cheema, Kenosha, WI (US); Joseph Scholzen, Silver Lake, WI (US)

(73) Assignee: MODINE MANUFACTURING COMPANY, Racine, WI (US)

( * ) Notice: Subject to any disclaimer, the term of this patent is extended or adjusted under 35 U.S.C. 154(b) by 105 days.

(21) Appl. No.: 15/823,962

(22) Filed: Nov. 28, 2017

(65) Prior Publication Data
US 2018/0156169 A1 Jun. 7, 2018

Related U.S. Application Data

(60) Provisional application No. 62/428,767, filed on Dec. 1, 2016.

(51) Int. Cl.
*B21D 53/02* (2006.01)
*F02M 35/10* (2006.01)
(Continued)

(52) U.S. Cl.
CPC ....... *F02M 35/10268* (2013.01); *B21D 13/04* (2013.01); *B21D 53/022* (2013.01);
(Continued)

(58) Field of Classification Search
CPC .... B21D 53/022; B21D 53/025; B21D 13/04; F28F 3/025; F28F 3/027; F28F 9/001
(Continued)

(56) References Cited

U.S. PATENT DOCUMENTS 3,850,018 A * 11/1974 Drosnin ................. B21D 13/04
72/186
4,436,145 A * 3/1984 Manfredo ........... F02B 29/0456
123/563
(Continued)

FOREIGN PATENT DOCUMENTS

EP 0903555 A2 8/1998
EP 0962736 A2 5/1999
(Continued)

OTHER PUBLICATIONS

Notification of First Office Action for Chinese Patent Application No. 2017112500011, The State Intellectual Property Office of the People's Republic of China, dated Mar. 13, 2019 (9 pages).
(Continued)

*Primary Examiner* — Allen J Flanigan
(74) *Attorney, Agent, or Firm* — Michael Best & Friedrich LLP; Jeron Valensa; Michael Bergnach

(57) ABSTRACT

An air fin for a heat exchanger has air channels defined by corrugations, the corrugations having generally planar flanks joined by alternating crests and troughs. Perforations extend through portions of at least some of the flanks and are aligned within two spaced apart planes. A rectangular aperture extends through at least two consecutive ones of the corrugations, and is bounded by the two planes. A method of making the air fin includes forming perforations into a continuous strip of metal sheet at regular intervals, corrugating the strip to form crests and troughs between the perforations, and punching out a portion of the strip at regular intervals. The punching out includes shearing webs between the perforations, and results in the formation of the rectangular aperture.

11 Claims, 6 Drawing Sheets

(51) Int. Cl.
*F28D 9/00* (2006.01)
*F02B 29/04* (2006.01)
*B21D 13/04* (2006.01)
*F28F 3/02* (2006.01)
*F28D 1/03* (2006.01)
*F28F 1/12* (2006.01)
*F28D 21/00* (2006.01)

(52) U.S. Cl.
CPC ........ *B21D 53/025* (2013.01); *F02B 29/0475* (2013.01); *F28D 1/0341* (2013.01); *F28D 9/0056* (2013.01); *F28F 1/128* (2013.01); *F28F 3/027* (2013.01); *F28D 2021/0082* (2013.01); *F28F 2215/08* (2013.01); *F28F 2275/205* (2013.01); *Y02T 10/146* (2013.01)

(58) Field of Classification Search
USPC .................................. 72/186, 326, 327, 379.6
See application file for complete search history.

(56) References Cited

U.S. PATENT DOCUMENTS

| | | | |
|---|---|---|---|
| 4,474,162 A * | 10/1984 | Mason | F02B 29/0456 123/542 |
| 4,502,315 A | 3/1985 | Dubrovsky et al. | |
| 5,318,176 A * | 6/1994 | Kaspersen | A47B 96/14 211/103 |
| 6,354,368 B1 | 3/2002 | Nishishita et al. | |
| 6,401,809 B1 * | 6/2002 | Zhang | F28F 1/128 165/111 |
| 6,460,393 B1 * | 10/2002 | Sundhagen | B21D 22/04 72/328 |
| 6,502,447 B2 | 1/2003 | Adams et al. | |
| 6,561,264 B2 | 5/2003 | Ozaki et al. | |
| 7,255,159 B2 | 8/2007 | Sagasser et al. | |
| 2003/0075307 A1 | 4/2003 | Stoynoff et al. | |
| 2003/0102113 A1 | 6/2003 | Memory et al. | |
| 2003/0183378 A1 | 10/2003 | Memory et al. | |
| 2004/0173344 A1 | 9/2004 | Averous et al. | |
| 2006/0157233 A1 * | 7/2006 | Ozaki | F28F 1/128 165/152 |
| 2007/0251681 A1 | 11/2007 | Higashiyama et al. | |
| 2010/0218915 A1 | 9/2010 | Chen | |
| 2014/0123683 A1 * | 5/2014 | Hou | F25B 21/02 62/3.6 |

FOREIGN PATENT DOCUMENTS

| | | |
|---|---|---|
| EP | 1164345 A1 | 12/2001 |
| FR | 2866698 A1 | 2/2004 |
| FR | 2909912 A1 | 12/2006 |
| WO | 2010049261 A1 | 10/2009 |
| WO | 2014074454 A2 | 5/2014 |
| WO | 2015148657 A1 | 10/2015 |

OTHER PUBLICATIONS

Extended Search Report for European Patent Application No. 17001416.1, European Patent Office, dated Mar. 15, 2018 (7 pages).

* cited by examiner

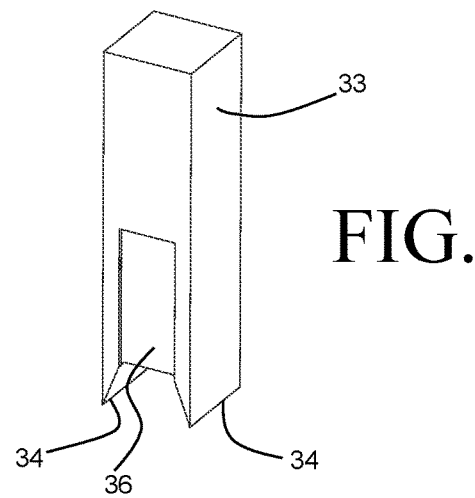
FIG. 7
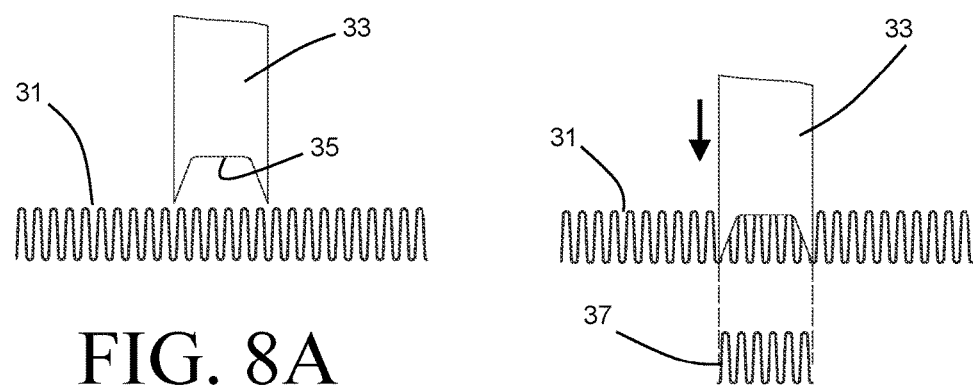
FIG. 8A
FIG. 8B

AIR FIN FOR A HEAT EXCHANGER, AND METHOD OF MAKING THE SAME

CROSS-REFERENCE TO RELATED APPLICATIONS

This application claims priority to U.S. provisional patent application No. 62/428,767, filed on Dec. 1, 2016, the entire contents of which are hereby incorporated by reference in their entirety.

BACKGROUND

Heat exchangers for transferring thermal energy between fluids such as gases and/or liquids commonly use finned metal structures formed from thin metal sheet material in order to more effectively transfer heat to or from the fluids. Such finned structures provide advantages by increasing the amount of surface area available to the fluid for convective heat transfer to occur, while minimizing restrictions in free flow area that inevitably result in undesirable flow resistance.

In certain circumstances, it may be necessary or desirable for other structures of the heat exchanger to extend through what would otherwise be available finned flow area for a fluid. As one example known from the prior art, U.S. Pat. No. 9,038,610 to Meshenky et al. shows a heat exchanger for cooling a flow of compressed charge air wherein ports for a coolant flow and a structural retention member are centrally located along the air flow path and extend through the height of the heat exchanger. In a heat exchanger disclosed therein, the ports and fastener are accommodated by providing two air fins at each air channel level, with a central space between the two air fins reserved for the coolant ports and fastener. Such an arrangement leads to an increase in parts, which can be undesirable.

For liquid flows, the aforementioned problem can often be addressed by forming apertures into the fin itself, as shown and described in U.S. Pat. No. 7,255,159 to Sagasser et al. The finned structures used for liquid flows and other similarly high-density fluids are typically of the stamped turbulator variety depicted in that patent, and are thereby relatively amenable to having apertures stamped into the finned structure as shown therein.

However, forming such features into the fin structures used for lower density gas flows, such as for example air, has proven to be much more difficult. Fin structures used for such flows are typically formed from thinner material, and are typically substantially taller in height and have substantially tighter fin spacing. Attempts to use the conventional stamping processes used for liquid turbulators on such air fins have been unsuccessful, resulting in severe deformation of the fin convolutions and causing impaired performance and assembly difficulties. Thus, there is still room for improvement.

SUMMARY

According to an embodiment of the invention, an air fin for a heat exchanger has air channels defined by corrugations, the air channels extending in a width direction of the air fin. The corrugations are defined by generally planar flanks joined by alternating crests and troughs. Perforations extend through portions of at least some of the flanks and are aligned along two spaced apart planes that are perpendicular to the width direction. A rectangular aperture extends through at least two consecutive ones of the corrugations, and is bounded by the two planes so that two opposing edges of the aperture are each aligned with one of the planes.

The rectangular aperture can be further defined by two additional edges that extend in the width direction of the air fin. Each of those two additional edges can extend along one of the troughs of the corrugations. In some embodiments, several successively arranged corrugations space apart those two edges.

The flow channels of the air fin can extend between an air inlet face at one end of the air fin in the width direction and an air outlet face at the opposing end. The rectangular aperture can be centrally situated between the air inlet face and the air outlet face by having the spacing between the air inlet face and one of the planes containing the perforations be equal to the spacing between the air outlet face and the other plane containing the perforations. In some embodiments it may alternatively be preferable to locate the rectangular aperture in a non-central location, in which case the rectangular aperture can be located closer to either the air inlet face or the air outlet face.

Surface augmentation features such as, for example, louvers can be provided on the flanks of the corrugations. The surface augmentation features, if present, can be separated into a first set of features on those portions of the flanks between the air inlet face and the nearest to the air inlet face one of the planes containing the perforations, a second set between the two planes containing the perforations, and a third set between the air outlet face and the nearest to the air outlet face one of the planes. In some embodiments the surface augmentation features can be eliminated in one or more of the sections. If surface augmentation features are present, they are preferably interrupted in the areas of the perforations.

In some embodiments it may be preferable to include additional rectangular apertures in the air fin. The rectangular apertures can be spaced apart in a direction perpendicular to the air fin width direction, so that each of the rectangular apertures is bounded by the same two planes containing perforations. Alternatively, the rectangular apertures can be spaced apart in the flow width direction by providing additional sets of perforations arranged along one or more planes that are parallel to, but not coincident with, the first two such planes. In some embodiments the rectangular apertures can be spaced apart in both the flow width direction and in a direction perpendicular to the flow width direction.

Regardless of whether surface augmentation features are provided on the corrugation flanks, the air fin is divided into at least two sections, with the planes along which the perforations are arranged defining the boundaries between those fin sections. In other words, a first fin section is located between the air inlet face and a first one of the planes along which the perforations are arranged, a second fin section is located between the two planes, and a third fin section is located between the air outlet face and the other one of the planes. As indicated previously, it is possible for the air fin to be separated into additional sections by the presence of perforations that are arranged along additional planes that are parallel to and offset from the first two planes.

Adjacent ones of the fin sections are joined together by webs arranged between adjacent perforations. The webs are preferably provided at each of the crests and troughs (except in the area of the rectangular aperture). In some highly preferred embodiments the perforations extend the full height of the planar faces of the corrugations, so that the webs are limited to only the crests and the troughs. In some other embodiments the webs can extend slightly into the planar faces. In still other embodiments, the perforations can extend into the crests and/or the troughs, so that the webs span across somewhat less than the entirety of each crest or trough.

In some especially preferable embodiments, the air fin has certain geometric characteristics that make it especially well-suited for use in heating or cooling a flow of air or other gas of similar density. Such an air fin can have a ratio between the height of the air fin (as defined by the distance between a plane tangent to convex surfaces of the crests and another plane tangent to convex surface of the troughs) and the material thickness of the air fin that is at least thirty, and in some preferable embodiments is at least forty, and in some especially preferable embodiments is at least fifty. Alternatively, or in addition, the air fin can a ratio between the height of the air fin and the corrugation pitch (as defined by the distance between centerlines of adjacent ones of the air flow channels in a direction perpendicular to the width direction) that is at least three, and in some preferable embodiments is at least six.

According to another embodiment of the invention, a method of making an air fin for a heat exchanger is provided. The method includes feeding a continuous strip of material through various successive stages. In one stage, a first and a second set of perforations are formed into the sheet at regular intervals. Alternatively, the first set and the second set of perforations can be formed into the sheet in two or more stages. Regardless of whether they are formed in one stage or in multiple stages, the first and second sets of perforations are spaced apart from one another in a width direction of the strip. Surface augmentation features can additionally be formed into the sheet within those stages, although this is optional.

After the perforations are formed, the strip is corrugated to form alternating crests and troughs. In doing so, the centerline of each crest and each trough is located mid-way between two successive perforations of the first set, as well as mid-way between two successive perforations of the second set. In a subsequent stage, a rectangular aperture is punched into the corrugated strip at regular intervals. Each such rectangular aperture extends over at least two of the corrugations. In a yet later stage, the air fin is separated from the continuous strip so that it contains at least one of the rectangular apertures.

In at least some embodiments, the rectangular aperture is produced using a punch tool that is displaced in a fin height direction of the corrugations. This fin height direction is perpendicular to both the width direction of the continuous strip and the feeding direction of the continuous strip. The punch tool has two sharpened edges that pierce through the continuous strip at trough locations, while a surface of the punch tool applies a force to portions of the crests between those two trough locations in order to shear the webs of sheet material that separate successive perforations. In some particularly preferable embodiments, the force is applied over fin crest portions that are slightly smaller than the spacing between the two sets of perforations and centered between the two sets, in order to more cleanly shear the web material. The application of the force and the piercing of the troughs with the two edges occurs in the same stroke of the punch tool, although either one can slightly precede the other during such a stroke.

In some especially preferable embodiments, the forming of the corrugations yields has certain geometric ratios that make the resulting air fin especially well-suited for use in heating or cooling a flow of air or other gas of similar density. In some such embodiments, a ratio between the height of the corrugations (as defined by the distance between a plane tangent to convex surfaces of the crests and another plane tangent to convex surface of the troughs) and the material thickness of the sheet is at least thirty, and in some preferable embodiments is at least forty, and in some especially preferable embodiments is at least fifty. Alternatively, or in addition, the ratio between the height of the corrugations and the corrugation pitch (as defined by the distance between centerlines of adjacent corrugations in a direction perpendicular to the width direction) is at least three, and in some preferable embodiments is at least six.

According to yet another embodiment of the invention, a heat exchanger for transferring heat between a flow of air and another fluid includes multiple air fins as previously described, arranged alternatingly with plate pairs that each provide a flow path for the other fluid through the heat exchanger. The plate pairs engage to form fluid manifolds through the stack, and communicate with an inlet port and an outlet port for the fluid. The plate pairs are provided with at least one opening extending through each plate pair, those openings being aligned with rectangular apertures of the air fins so that an unobstructed opening extends through the stack. The plate pairs and the air fins can be joined together in a brazing operation to form a monolithic stack.

The heat exchanger can further be provided with a bottom plate and/or with a top plate at ends of the stack. These plates can additionally be provided with an opening that aligns with the holes in the plate pairs and the rectangular apertures. The heat exchanger can be inserted into a housing, and can be at least partially secured and supported against forces (for example, due to pressurization of an internal volume of the enclosure) by a fastener extending through the aligned openings. Such a fastener can be a bolt, screw, tie rod, or other type of fastener to which a tensile load can be applied without causing significant extension of the fastener. In some embodiments, the heat exchanger can include multiple such aligned openings in order to accommodate more than one such fastener.

In some embodiments the heat exchanger can be a charge air cooler for cooling a flow of combustion air by transferring heat from that flow of air to a flow of liquid coolant. The liquid coolant can be, for example, engine coolant. In some such embodiments the enclosure into which the heat exchanger is arranged can be an air intake manifold of an engine.

BRIEF DESCRIPTION OF THE DRAWINGS

FIG. 7 is a perspective view of a punch for use in the operation of FIG. 5.

FIGS. 8A and 8B are elevation views of a punching stage of the fin forming operation of FIG. 5.

DETAILED DESCRIPTION

Figure 1:
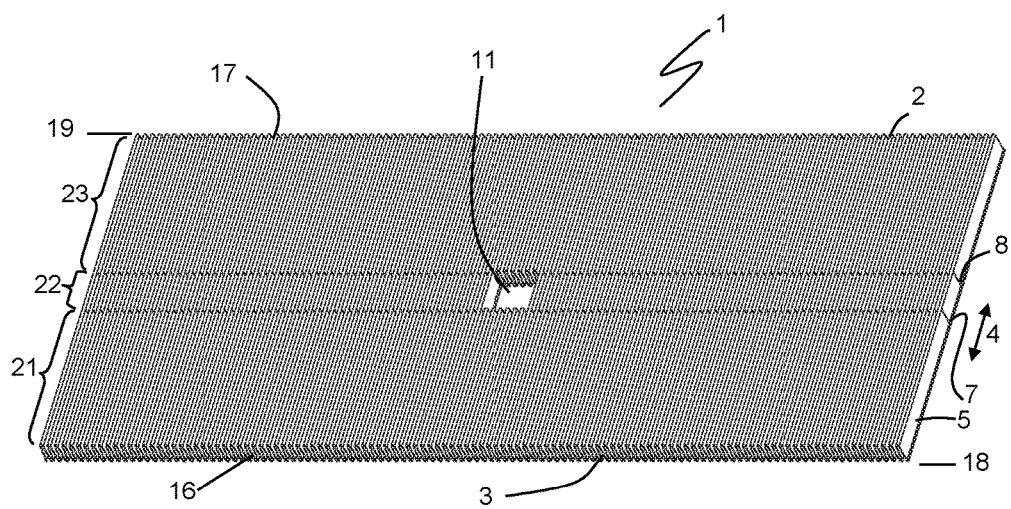
FIG. 1 is a perspective view of an air fin according to one embodiment.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

An air fin 1 according to some embodiments of the present invention is shown in FIGS. 1-4. The air fin 1 is especially well-suited for use in a heat exchanger, where it can be employed in order to heat or cool a flow of air passing through the fin. By way of example, such an air fin 1 can be advantageously employed in a liquid-cooled charge air cooler such as the charge air cooler 101 of FIGS. 9-11.

The air fin 1 is formed from a thin metal sheet to have corrugations 2, with air flow channels 3 defined within the corrugations. The corrugations 2 are defined by alternating rounded crests 6 and troughs 7 joined by generally planar flanks 5. While the crests 6 and troughs 7 are illustrated in the exemplary embodiment as fully rounded, in some embodiments they can alternatively be provided with a flat region at the apex. The air flow channels extend in a width direction of the air fin (indicated by the double-ended arrow 4 in FIG. 1) from an air inlet face 16 to an air outlet face 17. The width direction 4 of the air fin 1 extends between a first end 18 and a second end 19, with the air inlet face 16 arranged at the first end 18 and the air outlet face 17 arranged at the second end 19.

Figure 2:
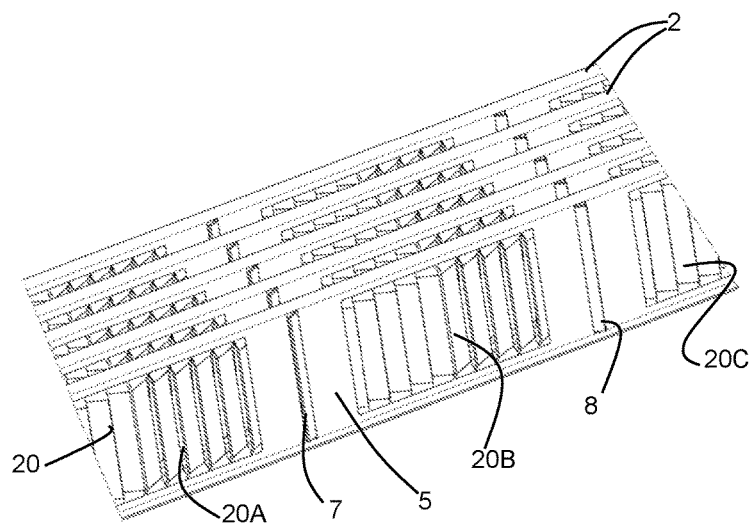
FIG. 2 is a partial perspective view of a portion of the air fin of FIG. 1, according to some embodiments.
Figure 3:
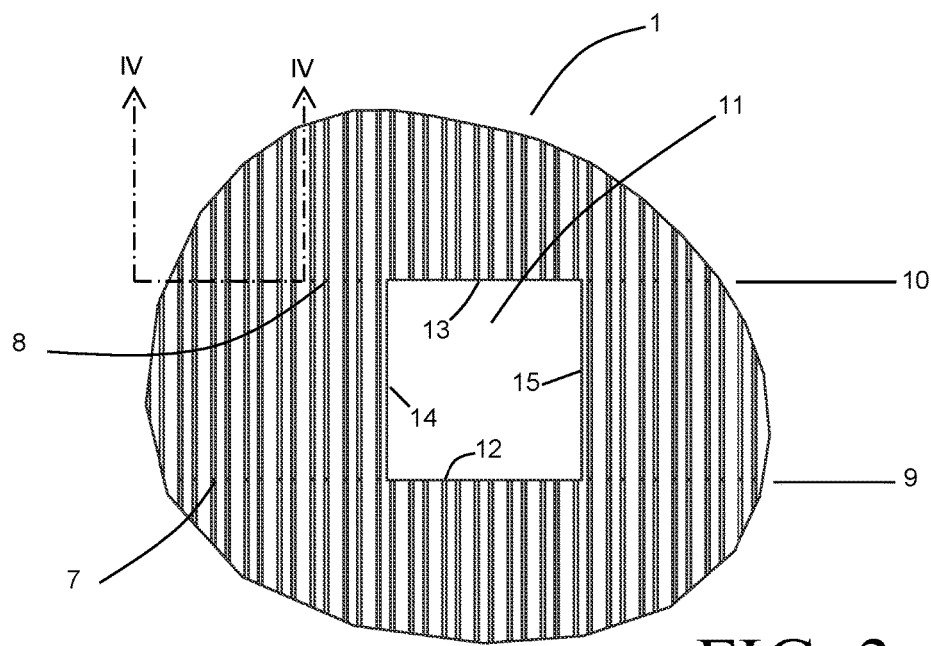
FIG. 3 is a partial plan view of the air fin of FIG. 1.
Figure 4:
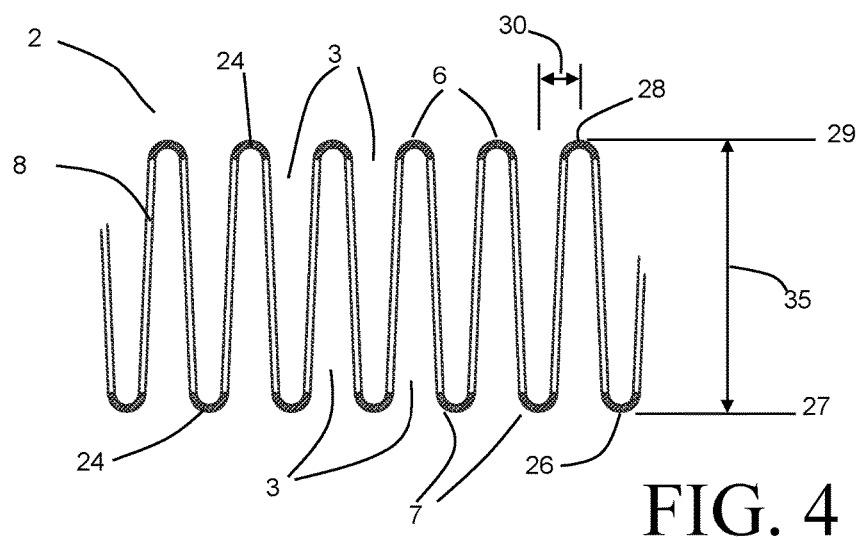
FIG. 4 is a partial cross-section view taken along the lines IV-IV of FIG. 3.

For ease of visualization, the planar flanks 5 of the air fin 2 are displayed as smooth surfaces in FIGS. 1, 3, and 4. However, in some especially preferable embodiments those planar surfaces 5 are at least partially populated with surface enhancement features such as louvers 20 (shown in FIG. 2) or the like. The surface enhancement features turbulate the flow of air passing through the flow channels 3, thereby enhancing the rate of heat transfer between the surfaces of the fin 2 and the flow of air. Such turbulation does come with the expense of additional flow resistance, leading to a generally undesirable increase in pressure drop. In some embodiments where such increased pressure drop is especially undesirable, the louvers 20 can be replaced by less aggressive surface augmentation features, and in some cases the flanks 5 can be provided with no surface augmentation features.

The air fin 1 is provided with a first series of perforations 7 and a second series of perforations 8. The perforations 7 are generally arranged within a plane 9 that is oriented perpendicular to the width direction 4. Similarly, the perforations 8 are generally arranged within a plane 10 that is also oriented perpendicular to the width direction 4, so that the planes 9, 10 are spaced a constant distance apart from one another. The plane 9 is located between the air inlet face 16 and the plane 10, and the plane 10 is located between the air outlet face 17 and the plane 9. Consequently, the air fin 2 can be considered as having three fin sections: a first fin section 21 between the air inlet face 16 and the plane 9; a second fin section 22 between the plane 9 and the plane 10; and a third fin section 23 between the plane 10 and the air outlet face 17. As depicted in FIG. 2, the surface augmentation features 20 can be separated into a grouping 20A located in the first fins section 21, a grouping 20B located in the second fin section 22, and a grouping 20C located in the third fin section 23. In this way, the perforations 7, 8 can be arranged within blank sections of the flanks 5 between the groupings, even in the case where the flanks 5 are provided with surface augmentation features 20.

As best seen in FIG. 2 and FIG. 4, the perforations 7, 8 of the exemplary embodiment extend over the entirety of each flank 5 in the direction of the fin height, where the fin height (indicated by the double-ended arrow 35 in FIG. 4) is defined as the distance between a plane 27 tangent to convex surfaces 26 of the troughs 7 and a parallel plane 29 tangent to convex surfaces 28 of the crests 6. In such an embodiment, adjacent corrugations 2 are connected at the planes 9, 10 only by webs 24 that extend over the crests and troughs. Such an embodiment is preferable for reasons that will be explained hereafter. However, in some alternative embodiments the webs 24 can be extended to include some portion of the flanks 5, or the perforations 7, 8 can extend partway into the crests 6 and/or troughs 7.

The air fin 1 is also provided with a rectangular aperture 11 extending in the fin height direction through a central portion of the fin. The rectangular aperture extends between the plane 9 and the plane 10 in the fin width direction, so that the aperture 11 has a first edge 12 aligned with the plane 9 and a second edge 13 aligned with the plane 10. The aperture 11 further has a third edge 14 and a fourth edge 15, each of which extend in the flow width direction to join opposing ends of the edges 12, 13. The edges 14 and 15 are each aligned with separate, spaced apart ones of the troughs 7. The aperture 11 thus extends over several of the corrugations 2. While the exemplary embodiment shows a rectangular aperture 11 where the edges 14, 15 are approximately equal in length to the edges 12, 13 (thus making the rectangular aperture 11 a square aperture), it should be understood that alternative embodiments may have a non-square aperture with edge pairs of two different lengths.

In some embodiments, such as the exemplary embodiment of the air fin 1, the rectangular aperture 11 is centrally located along the width direction 4. In such an embodiment, the distance by which the plane 9 is spaced from the end 18 of the fin is equal to the distance by which the plane 10 is spaced from the opposing end 19 of the fin. In other embodiments, however, those distances may be unequal so that the rectangular aperture 11 is not centrally located. In still other embodiments, an air fin may be provided with multiple apertures arranged at differing locations along the fin width, formed by additional sets of perforations.

The corrugations 2 of the air fin 1 are spaced so as to define a corrugation pitch (indicted as 30 in FIG. 4) as the distance between centerlines of adjacent ones of the air flow channels 3 in a direction perpendicular to the fin width direction 4. The corrugation pitch 30 thus includes the extent of a single one of the flanks 5 in that direction, as well as half of a crest 6 and half of a trough 7. The length of the rectangular aperture 11 in that direction perpendicular to the flow width 4 is thus an even multiple of the corrugation pitch 30.

Figure 9:
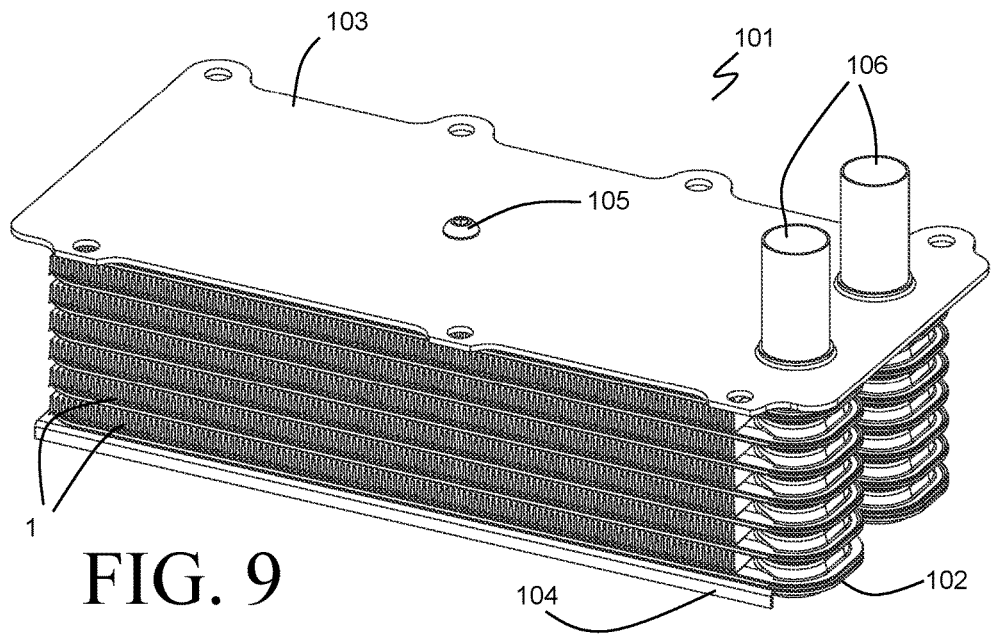
FIG. 9 is a perspective view of a heat exchanger including the fin of FIG. 1.
Figure 10:
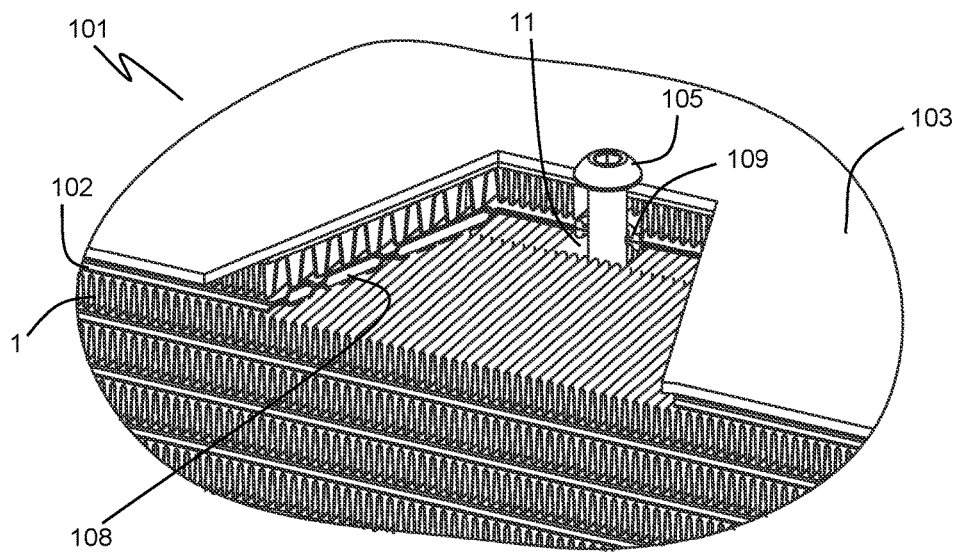
FIG. 10 is a partial cut-away view of the heat exchanger of FIG. 9.
Figure 11:
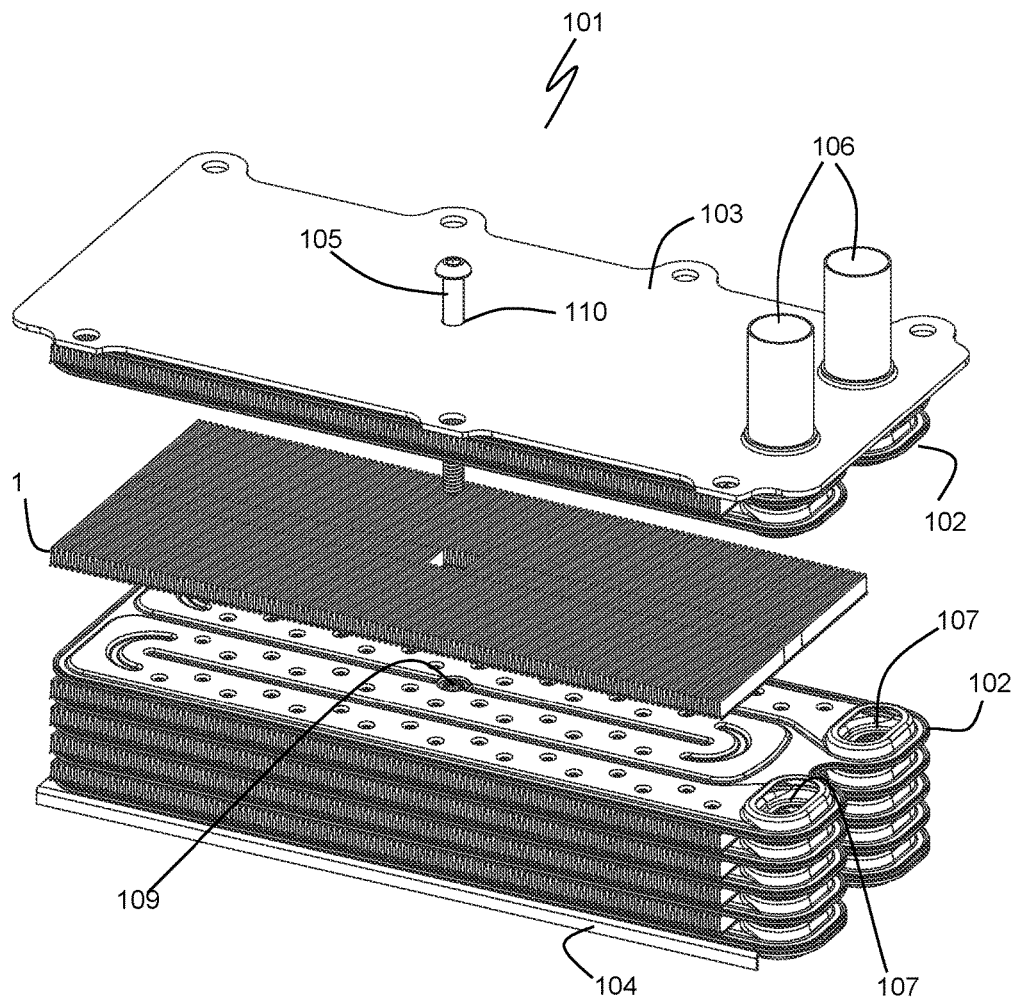
FIG. 11 is an exploded perspective view of the heat exchanger of FIG. 9.

The inventors have found that the forming of the rectangular aperture 11 into the fin 1 (the desirability of which will be described in detail hereafter with reference to FIGS. 9-11) becomes especially difficult as the fin height 35 increases in relation to either the material thickness of the fin 1 or the corrugation pitch 30. While similar apertures are formed into stitched turbulators (e.g. lanced and offset turbulators used for liquid flows) by a conventional metal punching operation, those turbulators typically have a height to material thickness ratio in the range of ten to fifteen and a height to pitch ratio in the range of 0.7 to 1.5. In contrast, the required ratios for an air fin are both substantially higher in order to avoid having an excessively high pressure drop imposed on the air. The air fin 1 of the exemplary embodiment has a material thickness of 0.15 mm, a fin height of 6.35 mm, and a corrugation pitch of 1 mm, resulting in a fin height to material thickness ratio of forty-two and a fin height to corrugation pitch ratio of 6.35. In some embodiments the ratio of the fin height to the material thickness is at least thirty, in some preferred embodiments at least forty, and in certain embodiments at least fifty. Likewise, in some embodiments the ratio of the fin height to the corrugation pitch is at least three, in some preferred embodiments at least six. With such ratios, the aforementioned known conventional forming processes lead to the undesirable deformation of the flow channels 3 in the region of the aperture 11.

Figure 5:
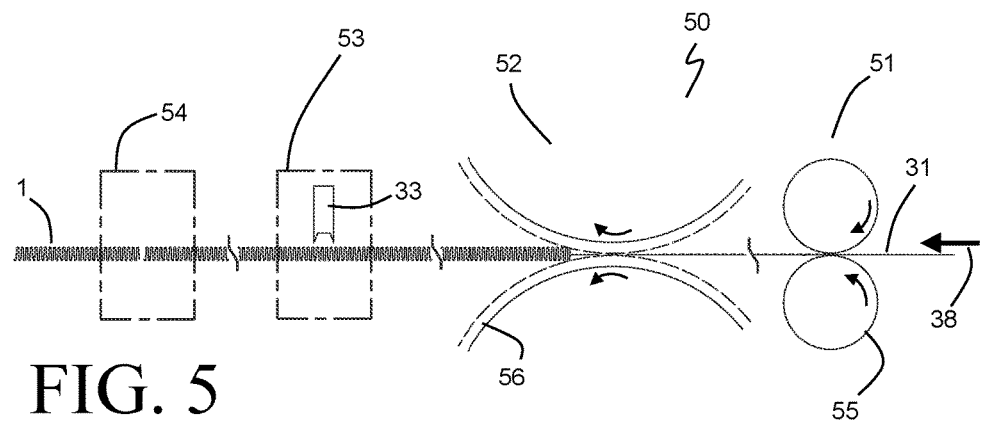
FIG. 5 is a diagrammatic view of portions of a fin forming operation 50 according to an embodiment.
Figure 6:
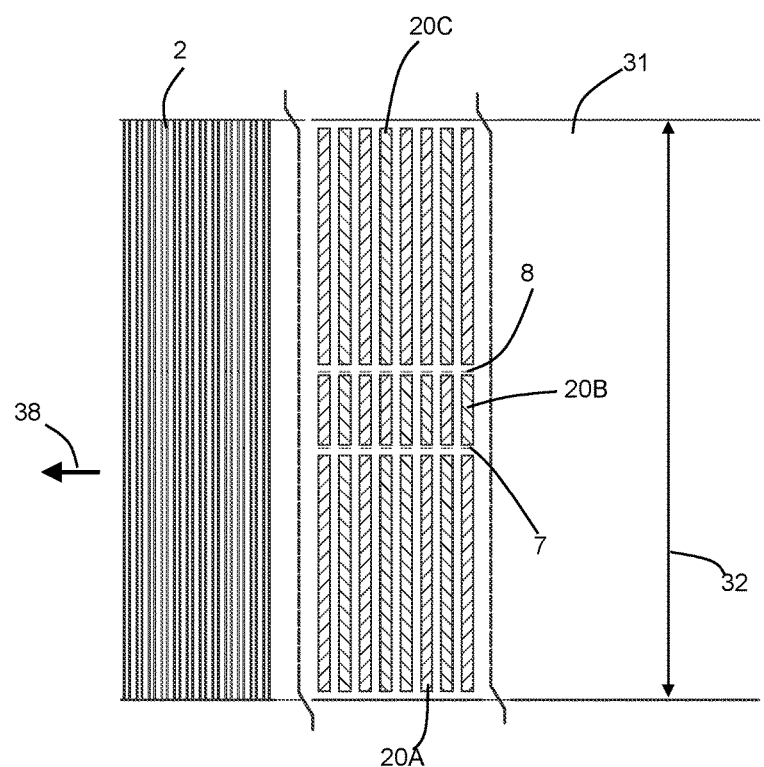
FIG. 6 is a plan view of portions of a material sheet at select locations along the forming operation of FIG. 5.

A process for forming the air fin 1 without undesirable deformation of the flow channels 3 in the region of the aperture 11 will be described with reference to FIGS. 5-8. FIG. 5 shows, in somewhat diagrammatic fashion, a fin forming operation 50 wherein the air fin 1 is produced from a continuous sheet 31 of fin material having a width 32. The sheet 31 progresses through successive stages of the forming operation 50 in a right-to-left feeding direction 38. It should be understood that not all of the operation which may be present in the forming process 50 are shown, as is indicated by the wavy break lines between the illustrated stages. Portions of the sheet 31 between the various stages are depicted in FIG. 6.

In a first illustrated stage 51 of the fin forming operation 50, the sheet 31 passes through a pair of rollers 55 that cooperate to form both the flow augmentation features 20A, 20B, 20C as well as the perforations 7, 8. As the rollers 55 rotate, features on the surface of the rollers (not shown) pierce and deform the material to form the desired shapes illustrated in FIG. 2. The portion of the sheet 31 prior to the stage 51 is depicted in the right-hand portion of FIG. 6, while the portion of the sheet 31 after the stage 51 is depicted in the center portion of FIG. 6. The flow augmentation features 20 and the perforations 7, 8 are formed into the flat sheet at a regular spacing, with the eventual crests and troughs of the air fin 1 to be formed between adjacent features.

In a subsequent stage 52 of the forming operation 50, the flat sheet 31 is formed into the corrugations 2 by a rolling operation using a pair of rollers 56. As is known to those of skill in the art, such a pair of rollers 56 can include meshing teeth that bend the sheet material 31 to form the crests 6 and troughs 7. The resultant corrugated sheet 31 is depicted in the left-hand portion of FIG. 6.

In a following stage 53, the rectangular aperture 11 is formed into the sheet 31. A punch 33 (shown in FIG. 7) is used to create aperture 11. During the punching operation itself, the movement of the sheet 31 in the stage 53 is temporarily halted. An accumulator (not shown) between the stage 52 and the stage 53 can be used to allow for the continuous movement of the sheet 31 through stages upstream of the stage 53. The corrugations 2 of the sheet 31 are precisely positioned so that cutting edges 34 of the punch 3 are aligned with the desired troughs 7. The cutting edges 34 have a length equal to the desired length of the edges 14, 15 of the aperture 11, and are spaced apart by a distance equal to the desired length of the edges 12, 13 of the aperture 11. In one especially preferred embodiment, worm gears (not shown) are used to engage the corrugations 2 in order to provide the exact required position as well as to space the corrugations 2 at the desired pitch 30 so that the cutting edges 34 are properly aligned with the troughs 7.

During the punching operation, the punch 33 is vertically displaced (as shown in FIG. 8B) so that the cutting edges 34 pierce through the fin material at those troughs 7. At generally the same time, a planar surface 35 of the die 33, which is vertically displaced from the cutting edges 34, contacts portions of the crests 6 between the cutting edges 34 and applies a force thereto. The applied force is sufficient to shear the webs 24 corresponding to those corrugations 2 between the cutting edges 34 at both the crests 6 and the troughs 7. This shearing of the webs 24, in combination with the piercing of the troughs by the cutting edges 34, results in the removal of a fin portion 37 corresponding to the rectangular aperture 11.

The shearing of the webs 24 is optimized by incorporating a recess 36 in opposing faces of the punch 33. Only one such face of the punch 33 is shown in FIG. 7, but it should be understood that the punch 33 is bilaterally symmetrical such that the opposing face has a similar recess 36. As a result, the dimension of the face 35 is slightly smaller, in the direction of the sheet width 32, than the spacing between the planes 9 and 10. The portion of the crests 7 to which the force is applied by the face 35 is consequently slightly offset from the perforations themselves, resulting in a cleaner break at the edges 12 and 13 of the aperture 11.

In a subsequent stage 54, the air fin 1 is separated from the sheet 31 by a cutting operation. In some variations, each air fin 1 can be produced with multiple rectangular apertures 11 through appropriate sequencing of the stages 53 and 54.

A heat exchanger 101 making use of multiple such air fins 1 will now be described, with particular reference to FIGS. 9-11. The heat exchanger 101 is intended for use as liquid-cooled charge air cooler for internal combustion engines, although other alternative uses are also possible.

The heat exchanger 101 includes a brazed assembly of plate pairs 102 and air fins 1 in an alternating arrangement. Each of the plate pairs 102 provides a coolant flow path 108 extending between a pair of coolant manifolds 107 defined by the plate pairs 102. Coolant ports 106 communicate with the coolant manifolds 107, so that a liquid coolant can be introduced to the heat exchanger 101 through one of the coolant ports 106, can be circulated through the heat exchanger 102 along the coolant flow paths 108, and can be removed from the heat exchanger 102 by way of the other coolant port 106. At the same time, a flow of air can be directed through the flow channels 3 of the air fins 1 from the air inlet face 16 to the air outlet face 17. As the air and the liquid coolant pass simultaneously through the heat exchanger 102, heat energy can be transferred from a hotter one of the air and liquid coolant to a colder one of the air and liquid coolant.

The plate pairs 102 are each provided with a hole 109 extending through the plate pair, features of one plate in the plate pair 102 joining to corresponding features of the other plate in order to provide a fluid seal at the hole to prevent leakage of the liquid coolant into the air, or vice-versa. The holes 109 correspond in general size and location with the rectangular apertures 11 in the air fins 1, so that an opening extends through the stack of air fins 1 and plate pairs 102.

The heat exchanger 102 further includes a bottom plate 104 and a top plate 103, each of which can be part of the braze assembly and is joined to an outermost one of the air fins 1 or the plate pairs 102. Both the top plate 103 and the bottom plate 104 are provided with a hole 110 corresponding to the holes 109 in the plate pairs 102. A threaded fastener 105 can thus be inserted through the entirety of the heat exchanger 102. The heat exchanger 102 can advantageously be inserted into an enclosure such as, for example, an air intake manifold, with the top plate operating to close the insertion opening. The fastener 105 can engage a threaded hole of the enclosure in order to help secure the heat exchanger 102 within the enclosure, and can provide structural resistance to pressurization of the enclosure.

It should be understood by those of skill in the art that, although the exemplary embodiment shown and described uses a threaded fastener such as a bolt or screw to extend through the aperture 11 formed in the air fins 1, such a fastener is shown by way of example only. There are a variety of alternative types of fasteners such as tie-rods and the like that would function similarly, and no restriction to the particular type of fastener or retention mechanism is intended or should be inferred. It should be further understood that the aperture 11 can be utilized for other purposes as well, such as, for example, to allow for an additional fluid manifold to extend through the height of a heat exchanger using such a fin.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A method of making an air fin for a heat exchanger, comprising:
    feeding a continuous strip of metal sheet having a predetermined width;
    forming a first set of perforations into the continuous strip at regular intervals;
    forming a second set of perforations into the continuous strip at regular intervals that coincide with the regular intervals of the first set of perforations, the second set of perforations being spaced apart from the first set of perforations in the width direction of the strip;
    corrugating the continuous strip to form alternating crests and troughs, the centerline of each crest and each trough located mid-way between two successive perforations of the first set of perforations and mid-way between two successive perforations of the second set of perforations;
    punching a rectangular aperture into the corrugated strip at regular intervals, each rectangular aperture extending over at least two of the corrugations; and
    separating the air fin from the continuous strip so that the air fin contains at least one rectangular aperture.

2. The method of claim 1, wherein the step of punching a rectangular aperture comprises:
    displacing a punch tool in a direction perpendicular to both the width direction of the continuous strip and the feeding direction of the continuous strip;
    piercing through a portion of a first trough of the continuous strip with a first edge of the punch tool;
    piercing through a portion of a second trough of the continuous strip with a second edge of the punch tool, the second trough being separated from the first trough by at least two corrugations; and
    applying a force with the punch tool to portions of the crests between the first trough and the second trough in order to shear the material of the continuous strip separating successive ones of the first set of perforations between the first trough and the second trough and successive ones of the second set of perforations between the first trough and the second trough.

3. The method of claim 2, wherein the step of applying the force with the punch tool comprises applying said force over a length of said crests that is less than a spacing between the first and second sets of perforations and is centered between the first and second sets of perforations.

4. The method of claim 1, further comprising forming flow augmentation features into the continuous strip at regular intervals that coincide with the regular intervals of the first and second sets of perforations.

5. The method of claim 4, wherein the flow augmentation features are formed into the continuous strip in the same operation that forms the first and the second sets of perforations.

6. The method of claim 1, wherein the step of corrugating the continuous strip establishes an air fin height that is at least thirty times as large as a material thickness of the continuous strip of metal sheet, the air fin height being defined by the distance between a plane tangent to convex surfaces of the troughs and a plane tangent to convex surfaces of the crests.

7. The method of claim 6, wherein the air fin height is at least forty times as large as a material thickness of the continuous strip of metal sheet.

8. The method of claim 6, wherein the air fin height is at least fifty times as large as a material thickness of the continuous strip of metal sheet.

9. The method of claim 1, wherein the step of corrugating the continuous strip establishes a ratio of at least two between an air fin height and a corrugation pitch, wherein the air fin height is defined by the distance between a plane tangent to convex surfaces of the troughs and a plane tangent to convex surfaces of the crests and wherein the corrugation pitch is defined by the distance between centerlines of adjacent crests and troughs in a direction perpendicular to both the predetermined width and the air fin height.

10. The method of claim 9, wherein the ratio of the air fin height to the corrugation pitch is at least three.

11. The method of claim 9, wherein the ratio of the air fin height to the corrugation pitch is at least six.

* * * * *